United States Patent [19]
Ilcisin et al.

[11] Patent Number: 5,880,770
[45] Date of Patent: Mar. 9, 1999

[54] APPARATUS AND METHOD FOR UTILIZING DISPLAY PHONE SET-UP TIME TO PROVIDE THIRD PARTY CONTROLLED MESSAGING

[75] Inventors: Kevin J. Ilcisin, Beaverton, Oreg.; Gordon J. Paynter, Ottawa, Canada

[73] Assignee: Technical Visions, Inc., Beaverton, Oreg.

[21] Appl. No.: 928,167

[22] Filed: Sep. 12, 1997

Related U.S. Application Data

[63] Continuation of Ser. No. 487,053, Jun. 7, 1995, abandoned.

[51] Int. Cl.$^6$ .............................. H04M 11/00; H04N 7/12
[52] U.S. Cl. ........................................... 348/14; 379/93.12
[58] Field of Search ...................... 348/14–19; 379/93.01, 379/93.05, 93.09, 93.12, 93.17, 93.23, 93.27, 93.28, 93.31, 93.37, 110.01, 201, 67, 88, 89, 114, 142, 112, 115, 207, 257, 202

[56] References Cited

U.S. PATENT DOCUMENTS

| | | | |
|---|---|---|---|
| 4,811,382 | 3/1989 | Sleevi | 379/67 |
| 4,850,007 | 7/1989 | Marino et al. | 379/67 |
| 5,184,345 | 2/1993 | Sahni | 379/93 |
| 5,321,740 | 6/1994 | Gregorek et al. | 379/67 |
| 5,400,068 | 3/1995 | Ishida et al. | 348/14 |
| 5,428,670 | 6/1995 | Gregorak et al. | 379/67 |
| 5,448,625 | 9/1995 | Lederman | 379/114 |
| 5,450,123 | 9/1995 | Smith | 348/17 |
| 5,528,672 | 6/1996 | Wert | 379/96 |
| 5,608,788 | 3/1997 | Demlow et al. | 379/142 |

FOREIGN PATENT DOCUMENTS

| | | | |
|---|---|---|---|
| 0452495 | 11/1934 | United Kingdom | 379/87 |

*Primary Examiner*—Wing F. Chan
*Attorney, Agent, or Firm*—Fliesler Dubb Meyer & Lovejoy LLP

[57] ABSTRACT

A system for transporting messages that originate potentially with a third party to one or more other parties each of which is communicating with the other over a transmission system and videophones is disclosed. The messages in the form of video images remain on both videophone displays for a variable length of time. The system enables viewing of an important message by a significant number of individuals over their videophones. The system utilizes the captive time that two parties experience during the setup and connection period for a real time communication.

35 Claims, 2 Drawing Sheets

APPARATUS AND METHOD FOR UTILIZING DISPLAY PHONE SET-UP TIME TO PROVIDE THIRD PARTY CONTROLLED MESSAGING

This application is a continuation of Ser. No. 08/487,053, filed Jun. 7, 1995, now abandoned.

BACKGROUND OF THE INVENTION

1. Field of the Invention

This invention pertains to the field of communication systems. More particularly, this invention relates to a method and a means for distributing important messages for viewing via a pathway that is independent of traditional broadcast mediums such as television.

2. Art Background

Public broadcast systems such as the radio or television are commonly employed for the distribution of messages having key importance. For example, such broadcast systems are usually employed to provide warning of an impending hurricane threat to a coastal area. Typically, such emergency warning messages are continuously played over the radio and television as interruptions on regular programming, or in the form of official commercials. In the past, such broadcast systems have permitted transmission of a single message to multiple listeners or viewers relatively efficiently.

However, the continual development of alternative transmission systems for both audio and video information, such as wide area networks, and the development of cable television systems that provide hundreds of channels along with sophisticated "personal agents" to select the images viewed on a particular channel is eroding the capability of message originators to efficiently reach a large audience. Given such increased capability by viewers to select from all the available information sources and to select the information to be received, a message originator may encounter increasing difficulty in ensuring that messages are viewed by the appropriate viewers.

Some prior messaging systems suffer from such limitations due to a reliance on a primarily single direction broadcast mode. Such systems include, for example, the radio or television networks that currently exist. Other prior messaging systems are limited due to a reliance on a communication mode that requires a first party to specifically send a message only to a second party, often at a specific request of the second party.

For example, in U.S. Pat. No. 4,734,765, Okada et. al. describe a center-to-end type information system. Such a system permits the transmission of several messages stored in one location to multiple users, but only if a subscriber requests access to a server system and requests information.

In U.S. Pat. No. 5,132,992, Yurt et. al. also describe an audio and video transmission and receiving system. Yurt et. al. describe various forms of audio and video information that can be sent between a source library that stores data and multiple subscribers. Yurt et. al. allow for transmission over standard telephone, cable or satellite broadcast channels. However, the system of Yurt et. al. requires that a requesting party specifically log on and access the desired information. Unfortunately, such a system does not ensure that a person who is not looking for specific information will be alerted to an important public service message.

Brandon et. al, in U.S. Pat. No. 4,924,303 describe a system for the retrieval of television still frame and audio segments. Brandon et. al. require that two signal networks be used simultaneously, including the telephone system for control and audio information and a separate signal network for the video information. Unfortunately, the system of Brandon et. al. requires that a user request access and select a specific image and audio message and a one way type transmission system.

Auber in U.S. Pat. No. 4,896,347 describes an interactive video communications system wherein an information server is connected by the public switched telephone network. However, the system of Auber requires the aid of control signals that enable a user or subscriber who specifically connects to the server to access information and messages.

In U.S. Pat. No. 4,685,122, Deveron et. al. describe an interface circuit and a method that permits interactive audio/visual demonstrations controlled by DTMF tones from a telephone and permits viewing of pre-recorded messages via telephone control. Unfortunately, the system of Deveron et al. requires that a party specifically request the messages. Moreover, the control signals and not the actual message is transmitted over the various networks in the system of Deveron et al.

Jones et al. in U.S. Pat No. 5,193,110 describe a multi-port switching hub to provide a plurality of application ports or messages to a number of users through the telephone system. However, Jones et. al. teach of a single user receiving information by request only.

A system for receiving messages for viewing over a videophone is discussed in relation to a videophone answering machine by Hasimoto U.S. Pat. No. 4,829,555.

The above systems, however, do not address the problem of providing messages for viewing by parties that are not necessarily responsible for the message content.

SUMMARY OF THE INVENTION

A system for transporting a message that originates potentially with a third party to one or more other parties each of which is communicating with the other over a transmission system and videophones is disclosed. The videophones can be implemented using stand-alone videophone systems or using peripheral devices in multi-media capable computer systems. The transmission system can be the public switched telephone network, predominately landline based data networks such as the internet, predominately wireless networks such as the cellular phone networks in place across the country, or via two-way cable television networks.

When a calling party initiates a videophone call to a second party and makes an initial connection to the transmission system, messages are displayed on the videophone screens, along with an audible dial-tone or alternative call received alert such as a dialog box which is displayed on the screen of a computer that has resident hardware and software that permit it to operate as a videophone. The content of such an image can be generated by a third party. When connection is made to the videophone of the second party messages are displayed on the display device of the second party. The messages in the form of video images remain on both displays for a variable length of time which lasts while the second party answers the call, and while the system completes sending of one or more messages and then completes the connection between the two parties by transferring control of the information channel to the calling and receiving parties. The system may complete the sending of the message in mid-stream to ensure the quickest connection be established between the calling and receiving parties. The system may also complete the sending of an entire message, which is essential in the case of a public service warning regarding evacuation because of a storm. In such a case, the system ensures that the entire message is received by the parties, and delays transfer of the channel until both parties respond by "picking up the phone" indicating that both parties have seen the message. The third party generated image is then replaced by images transmitted between the two parties. The system permits a third party message, such as a public service announcement regarding impending storm conditions or a commercial message, to reach parties that might not generally receive such a message through traditional broadcast channels such as the radio or television.

The system enables viewing of an important message by a significant number of individuals over their videophones. The term videophone includes a generic combination of hardware and software that permits two or more parties to communicate with each other over a transmission medium with the transfer of both aural and visual information between the two parties. Videophones include dedicated systems such as the AT&T model 2500 or Intel videophone products such as the personal videoconferencing 200 system, or the multitude of multi-media based adapter cards that give the owner of a personal computer the equivalent capability for video and audio communication through a personal computer.

The system utilizes the captive time that two parties experience during the setup and connection period for a real time communication. The captive time begins when the calling party engages in the act of dialing or requesting a connection to a second party, and includes the time when the second party acknowledges the alert to a new request for a communication that is normally indicated by the ringing of a phone and by lifting the handset or by clicking the mouse or keyboard to respond to a computer dialog box message. The captive time also includes the time that the system holds off transfer of the communication channel to the calling and receiving parties to complete message transmission. During the captive time, a third party may transmit one or more non-identical messages to each party. Both parties are likely to be attentive during this time, and are both likely to view the visual images during the captive time interval of a few seconds.

BRIEF DESCRIPTION OF THE DRAWINGS

The present invention is described with respect to particular exemplary embodiments thereof and reference is accordingly made to the drawings in which.

DETAILED DESCRIPTION

A messaging system is disclosed wherein one or more third party conceived messages that are stored or provided in real-time are made to appear on each of the displays of a set of videophones that are connected over a network that permits a videophone call or a videoconferencing call. The messaging system disclosed employs a communication time interval that is presently void of information content, and does not increase the nominal length of time required to transmit such information. The methods described herein also contemplate the extension of the time required to setup a communication channel to allow longer time interval messages if such a period of time is acceptable by system users.

Figure 1:
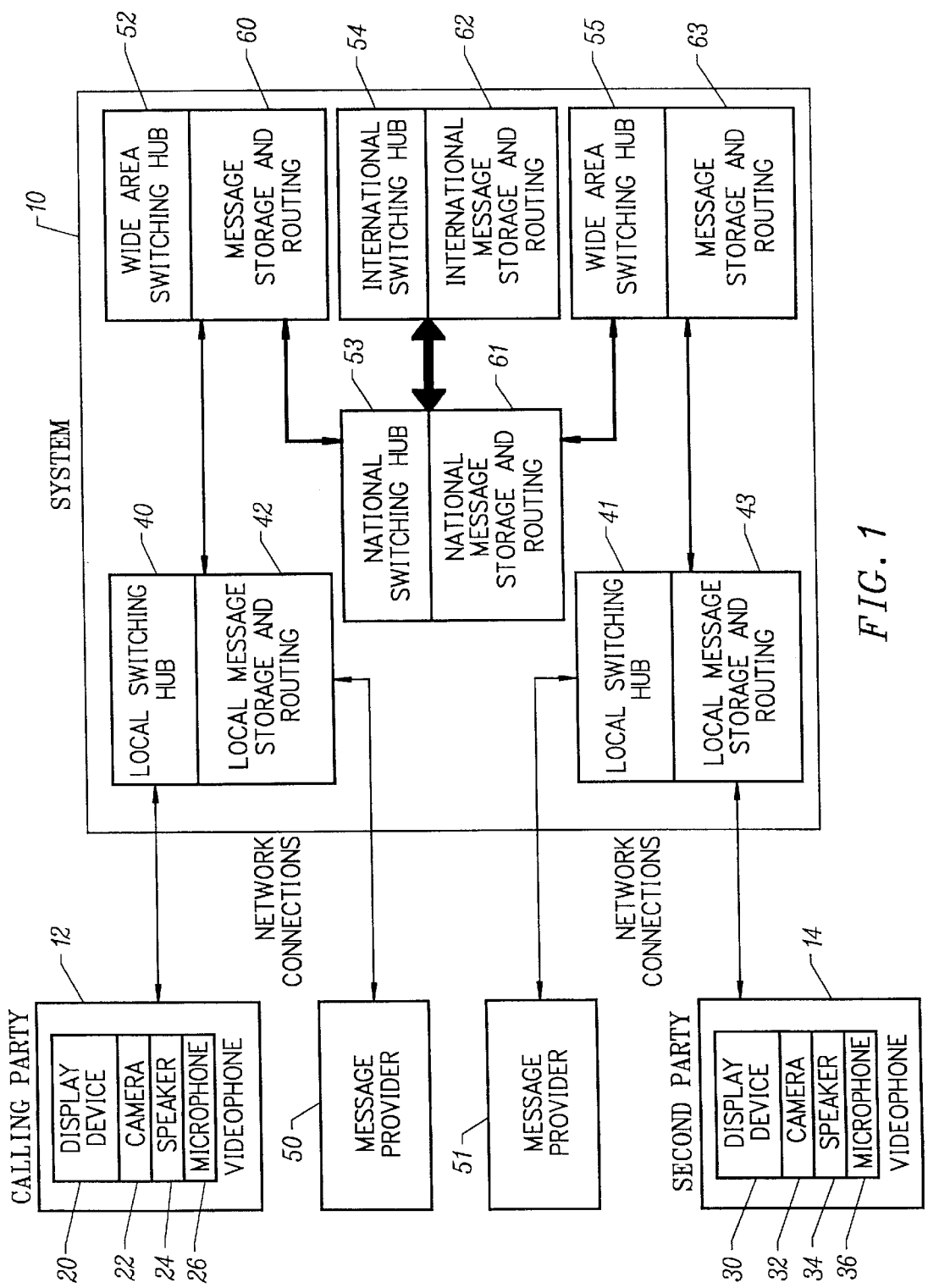
FIG. 1 is a block diagram that illustrates a set of communication system elements that provide a videophone messaging system.
Figure 2:
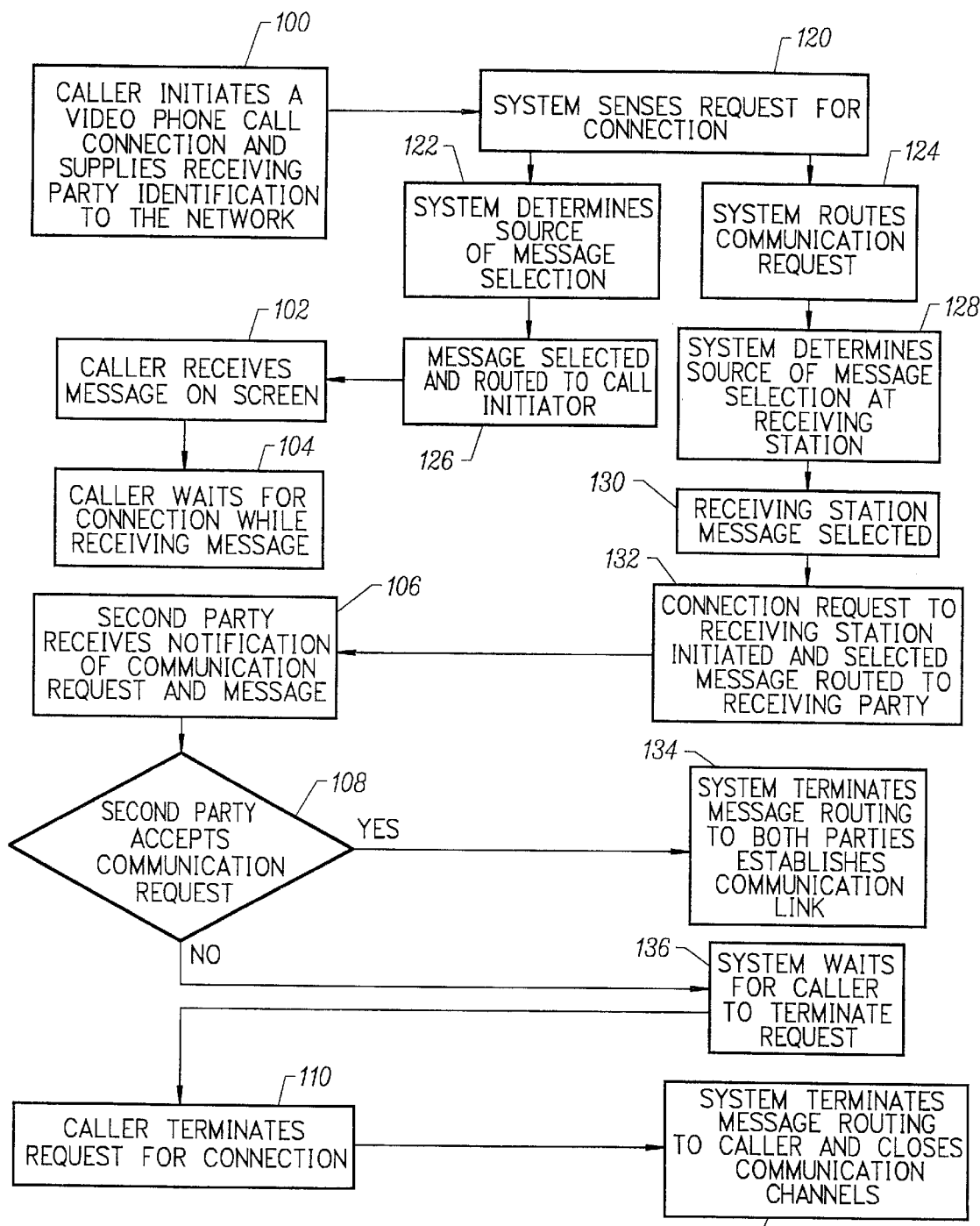
FIG. 2 is a flow chart indicating the steps of the present invention.

FIG. 1 illustrates a system that enables the transfer of multiple third party messages to two parties connected to each other via a communications network or system. FIG. 2 illustrates the steps and the timing during which a third party message is viewed by the calling party, i.e. the caller who initiates a communication, and a second party contacted by the calling party.

Referring now to FIG. 1, a system is illustrated that enables communication via a communication system 10 between a calling party and a second party using a pair of videophones 12 and 14. The communication system 10 provides for both visual and audio communication with distant parties and may also be referred to as a network.

The videophone 12 includes a display device 20 for displaying visual information, a speaker 24 for transmission of audible information, a camera 22 for converting the image of the caller, or the information the caller wishes to transmit to a form suitable for transmission over the communication system 10, and a microphone 26 for converting the audio or aural portion of the caller's information into a signal suitable for transmission over the communication system 10. Similarly, the videophone 14 includes a display device 30, a speaker 34, a camera 32, and a microphone 36.

Alternatively, each camera 22 and 32 may be replaced by an image frame memory of a computer system for the corresponding party which stores the image information in a mode suitable for conversion and transmission over the communication system 10.

Each videophone 12 and 14 may be implemented in the form of a stand-alone videophone unit such as the AT&T model 2500. Alternatively, each videophone 12 and 14 may take the form of a combination of hardware and software such as the Intel Personal Videoconferencing 200 product which includes an interface card for a personal computer, a standalone camera and microphone, software, and use of the computer display as the receiving display system. Each videophone 12 and 14 can also be configured primarily for transmitting data or pictures of information other than that of the calling party.

The calling party is connected to the communications network 10 which, for example, may employ any combination of the public switched telephone network, a cable television network, a cellular phone network, a satellite network, or wide-area computer networks such as the internet. The type of communication pathways depends on the configuration of the communication system 10 and the videophones 12 and 14 and may include either physical connections such as wired or fiber optically connected pathways, or radio frequency connected channels like the cellular phone network.

The communication system 10 provides the switching and routing capabilities for communication between two distant parties. The internal details of the communication system 10 vary depending on the communications network type, but these details do not affect the implementation of the methods described herein.

The calling party is connected to the communication system 10 through a local switching hub 40 and the second party is connected to the communication system 10 through a local switching hub 41. The second party may also be referred to as the called party or the receiving party. The local switching hubs 40–41 are each capable of detecting a request to contact a second party by the locally connected party, and to begin switching and establishing a communication pathway or link to the identified second party. The local switching hubs 40–41 may, for example, detect a request to utilize one of multiple communication networks with the detection of an "off hook" signal for a public switched telephone network, or with the receipt of a predetermined binary string by a local switching center from a computer connected to a network such as the internet.

The site of each local switching hub 40–41 includes a corresponding local message storage and routing device 42–43. Each message storage and routing device may include a server with a large memory and message routing information. The message routing information provided by the routing device 42–43 determines whether the parties are to be sent a local message or is to view a message that is initially available at some more distant location and potentially viewed by a larger group of individuals at multiple distant locations. Each local message storage and routing device 42–43 can be accessed, either directly or through the local switching hub, by one of many message providers represented by a pair of message providers 50–51. The message providers 50–51 may each be a third party that composes a message for viewing.

The means by which the message providers 50–51 contact, provide and/or transfer messages to the local message storage devices 42–43 may be accomplished in a variety of embodiments. For example, the message can be sent using a videophone arrangement wherein the message provider 50 or 51 employs a videophone for communication or by a direct connection to a message server for the communication system 10, or by depositing a copy of the message with a network services division who can install the message on the storage facilities of the communication system 10 directly. Alternately, the message provider 50 or 51 could provide the system 10 with a suitable message in real time via a communications link between the system 10 and the message provider. This could be, for example, the home page of the message provider's system, which can be sent or accessed by the system 10.

Along with the desired message, each message provider 50–51 supplies information on the geographical scope to which the message should be sent. Such information provides the communication system 10 with the routing information required for sending messages locally, nationally, and internationally.

The local message storage devices 42–43 may store information in either compressed or uncompressed form on a magnetic disk, a read/write optical disk or other types of storage media such as tape. The messages are sent to the calling or receiving parties who use a videophone connected to the communication system 10. The messages may be created, written, or designed by an individual, an institution, a group or organization, or a designer on behalf of an individual.

The messages are designed to conform with the required standards set by the system requirements. For example, messages are designed for display at a predetermined resolution and addressability, and to last for a specific period of time. The messages may be created with commonly available graphics arts or drawing programs such as Aldus persuasion® or ClarisDraw®. The messages may be a series of images formatted for example as a Quicktime® movie having both motion and sound associated with the video images. The messages may also be formed using traditional drawing methods and transferred to an electronic form either through the use of a tape based or a digital video or still frame camera. Once in an electronic form, the message can be provided in real time to the system or is transferred for storage to the appropriate local message storage device 42–43.

Transfer of a message between the message providers 50–51 and message storage facilities such as the facilities that include the local message storage devices 43–43 may be accomplished in a number of ways. The most preferable is the transfer of the message over one of the various network systems in electronic form. For example, a message may be transferred via a modem wherein the message provider dials or connects to the nearest message storage device of the communication system 10 by using a prescribed phone number or TCP/IP address.

The message provider 50 or 51 is queried by the communication system 10, either by an individual employed by the communication system 10, via electronic mail, or via an electronic form or request capability of the system 10 such as a prerecorded set of questions or an electronic form that requires entries in a manner that can be easily supplied by the message provider 50 or 51. The message provider 50 or 51 provides information on the content of the message, the length, and the preferred geographical region for the message to be sent which provides the routing information for the communication system 10. The message provider 50 or 51 is also informed of any costs associated with transmitting the message to calling and receiving parties with the costs being dependent on the type of message, number of times that the message is transmitted, and the geographical area. The message provider 50 or 51 also supplies billing information to the communication system 10. The communication system 10 upon completion of the information gathering accepts transmission of the message and stores the message for eventual transmission to calling and receiving parties.

Transfer of the message from the message provider 50 or 51 may also be completed through non-electrical means. The message information including time and geographical area provided on a prepared form, and the video information stored electronically on a disk or tape, could be mailed to a message center corresponding to one of the message storage facilities 42–43 or 60–63.

A suitable communication network is generally comprised of a number of various switching hubs. At the various physical locations of the switching hubs, which can be controlled by a computer or other combination of hardware and software which may not be physically co-located, there are potentially multiple message storage and routing information storage devices which can also be controlled by a combination of hardware and software not physically co-located. These hubs can be a local, wide-area national or international locations and a communication link can be established between all hubs.

The communication system 10 is shown comprised of the local switching hubs 40–41 which are connected to a pair of wide area switching hubs 52 and 55 which are connected to a national switching hub 53 and an international switching hub 54. The specific arrangement of the communication system 10 is provided for purposes of illustration only. A given call does not need to pass through all such hubs during routing from the calling party to a receiving party.

If both the calling and the receiving parties are connected to the same physical local hub, then the local hub establishes the appropriate communications link between the parties. However, the local hub may still receive information and messages from a message router that is not co-located with the local hub. Accordingly, two parties within one geographical area can still receive messages originating at a distant site. These various links exist and are available if needed for the purposes of establishing the communication link.

In an embodiment that includes multiple networks and systems (not shown), the switching hubs include transfer hubs. For example, a transfer hub is a switching hub at which a cellular videophone connection is switched into the traditional land-line based phone system having an attached videophone system.

Referring again to FIG. 1, the second party is connected to the communication system 10 in a substantially similar manner as the calling party. The second party will preferably also have the videophone 14 described previously. However, either one or the other of the parties could potentially not have a videophone and the system would still provide the third party message to the party that did have a videophone.

In a multiple party conferencing embodiment (not shown) wherein several parties are linked to at least one common communication channel, preferably with videophones, the second party can represent a number of second parties. Each of the second parties is contacted regarding the desire by the first party to be considered the calling party and to establish a communication link between all of the parties. In such an embodiment, each party receives a message in the same manner that a second party receives a message as described in the-two party example provided herein.

FIG. 2 illustrates the steps that the calling party, the communication system 10, and the second party undergo to enable viewing of a third party message by the calling party or the second party or both. The second party may also be referred to as the receiving party. The steps 100–110 illustrate primarily the actions of the calling party and the receiving party. The steps 120–138 refer to the actions and steps of the communication system 10. The following description provides a series of steps for a system in which videophones are commonly used for real time communication. In such an embodiment, the communication system 10 can route the video phone information extremely quickly.

The general method described herein is also suitable for use in an embodiment wherein one or more of the communicating parties does not have a videophone. In such an embodiment, the communication system 10 routes the video information directly to a non-video capable phone. The video information is merely ignored by an non video capable device. The communication system 10 may insert an additional step of polling or requesting information from both the calling party system and the receiving party system which would inform the communication system 10 of the video capabilities of the two parties. Alternatively, the videophones 12 and 14 may have additional signaling or identifying characteristics that the communication system 10 detects and that indicate whether a videophone is being used.

At step 100, the calling party that desires to undertake a videophone call or conference with one or more parties initiates a videophone call connection in one of several ways. For example, if using a traditional stand-alone videophone system, the calling party picks up the handset, or presses a dial button or a specific line button on a multi-line connected phone. If the videophone 12 is implemented in a computer system, then the caller launches the application software that begins a videophone window consistent with the operating system of the particular computer system, and then selects the command sequence associated with dialing or connection to the communication system 10. A series of similar actions are undertaken by a calling party wishing to connect to various other networks other than the public switched telephone network. The actions by the calling party at step 100 informs the communication system 10 that the calling party seeks to establish a communication link to a second party.

After making the initial connection, the calling party enters the sequence of codes required by the communication system 10 to identify the second party. For simple phones, the calling party enters the codes by dialing the phone number of the second party. For computer networks such as the internet, the calling party could supply a TCP/IP address of the second party.

The initiation of a connection request by the calling party is received by the local switching hub 40. Upon sensing a request for connection at step 120, the communication system 10 begins executing at least two simultaneous tasks at steps 122 and 124.

At step 122, the communication system 10 retrieves message information from the local message storage and routing device 42. The message information indicates whether a locally or otherwise based message is to be routed to the videophone 12 of the calling party. The message information permits the communication system 10 to ensure that the appropriate message is viewed by the calling party. For example, if the most important message that needs to be viewed by calling parties in an area is a message that only has a small geographical area of interest, such as a local storm warning, then the communication system 10 determines that the local weather warnings are the messages to be sent out to a calling party from the appropriate area and accordingly retrieves the local message for transmission. As another example, if the calendar date of the initiated call happened to be a national election day, then the communication system 10 could bypass the local message storage system as a source of the message and access a nationally applicable message stored at the national message storage device 61 or access in real time a message from a specific provider 50 or 51. The nationally applicable message is then routed to the appropriate local message stations for direct transmission to the calling party or parties.

The communication system 10 uses the local switching hubs 40–41, the wide-area switching hubs 52 and 55, the national 53 and the international 54 switching hubs to connect to the local 42–43, the wide-area 60 and 63, the national 61 and the international 62 message routing information and storage devices which permits selectivity of the message source.

Step 122 may be implemented in real-time wherein the communication system 10 determines the messages to be transmitted and selects the messages as the calling party initiates a call. Alternatively, the message information may be provided at other times and the local systems are already prepared for an appropriate message transmission prior to the step 120 having loaded a message that originates outside the local area.

At step 124, the communication system 10 begins the actual routing of the communication request to establish a communication channel between the calling party and the second party requested by the calling party. The local switching hub 40 contacts other hubs with the information regarding the location of the second party. The switching hubs 40–41 and 52–55 construct the appropriate combination of channels, potentially of different networks to establish the connection to the second party.

At step 126, the communication system 10 transmits the appropriately selected message to the calling party which receives the message at step 102. The selected message is then available for viewing by the calling party at step 104 while the calling party is waiting for establishment of the communications channel by the communication system at steps 124–132. This time interval at step 104 includes time for the notification of the second party of the communication request at step 106 and the time required for the second party to acknowledge and accept or otherwise reject the request for communication at step 108, and the time that the system may choose to hold off transfer of the communication channel to the calling and receiving parties to complete message transmission at step 134. This time could be determined by the length of a particular message the system is instructed to finish transmitting before transferring control of the communication link to the calling and receiving parties.

If the calling party would have used a typical voice-only phone, then the time-interval at step 104 would correspond to the time that the calling party waits for the phone to be answered on the opposite side, and the notification that the second party is trying to be reached at step 106 would be accomplished by the transmission of a ringing tone indicating that the communication system 10 has routed the call to the second party and is now awaiting a response. A key advantage is that the calling party is awaiting the potential connection and is viewing the display device 20 and listening to the speaker 24 to appear ready to communicate the instant the receiving party completes the connection. The present messaging system within the communication system 10 uses this captive time to ensure viewing of a short or potentially multiple quantized messages by the calling party.

While the communication system 10 transmits the message to the calling party at step 126 and while the calling party waits for the establishment of the connection at step 104, the communication system continues the task of completing the connection to the second party at steps 128–132. As the network switching hubs 40–41 and 52–55 hubs route the connection request, information on the message to be viewed by the second party is also accessed from the various message routing devices 42–43 and 60–63. The communication system 10 determines the source of the message selection for the second party at step 128 and then retrieves the appropriate message at step 130 from the actual physical storage location located either at the local switching hub closest in the chain to the second party, a more distant storage hub, or directly from a message provider 50 or 51 in real time.

The steps 128–130 provide the same selectivity of the message source and content to the second party as is provided to the calling party. The second party does not necessarily need to view weather warnings for a location that may be thousands of miles away from the second party. However, if conditions warrant, the same message would be viewed by both the calling and the second parties.

After establishing a connection to the appropriate local switching hub, and after selecting the source of the appropriate message, and after routing the message to the appropriate local switching hub, the communication system then requests a connection to the second party and begins routing the message to the second party at step 106.

At step 106, the second party is alerted to the incoming communication request and the selected message or series of quantized messages appear on the videophone display device 30 and potentially on the videophone speaker 34. An alert message may be composed of an image message and an audio signal, or may take the form of a traditional alert such as the sound of a phone ringing along with the appearance of an image only message on the display 30 of the videophone.

At step 108, the communication system 10 awaits the acceptance or rejection of the communication request by the second party. If the second party accepts the call at step 108 by switching the phone on, or by selecting the videophone 14 from the appropriate computer system menu items, or by other appropriate actions, the communication system 10 then at step 134 terminates transmission of the series of messages being sent to both the calling and the second party. Step 134 completes the establishment of the desired communications link, and thereafter the two parties could continue with the desired communication.

While undertaking the appropriate steps to accept an incoming call at step 108, the second party would look towards the display device 30 and the camera 32 in preparation for the start of the communication. Thus the second party also provides the communication system 10 and the third party composer of the message with a captive time for viewing the message being sent. The second party may accept the connection directly or the call may be accepted by some form of an answering machine (not shown) for the videophone 14.

The second party may reject the communication request at step 108 for a variety of reasons. For example, the second party may already be connected to the communication system 10 with another communication or may not be available to accept the transmission and may not have any combination of answering machines, voice mail, or other devices including videophone answering machines capable of recording both audio and video messages. If the call is rejected at step 108, then the communication system 10 awaits the termination of the connection by the calling party at step 136. The communication system 10 stops the transmission of the messages to both parties, and closes all the open connections within the network that established the communications link between the calling party and the second party at steps 110 and 138.

The methods and means described above may be extended to multi-party videoconferencing wherein each party to be contacted for the videoconference is considered the receiving party as each is added to the call.

If one or the other of the calling and the second party does not have access to a videophone, the communication system 10 could determine which of the parties had such equipment and route the message to the appropriate one of the two parties.

The following references describe in more detail the various means and various devices that comprise or are needed to permit communication in either one or two ways over the various transmission systems such as the public switched telephone service, cable television, cellular, dedicated land line based or satellite channels. These references describe various configurations of a videophone or desktop videoconferencing, including descriptions of compression or signal techniques, and network switching arrangements. The pertinent references include: U.S. Pat. No. 4,258,387 of Lemelson et al., U.S. Pat. No. 4,291,198 of Anderson et al., U.S. Pat. No. 4,893,326 of Duran et al., U.S. Pat. No. 4,932,047 of Emmons et al., U.S. Pat. No. 5,042,062 of Lee et al., U.S. Pat. No. 5,073,926 of Suzuki et al., U.S. Pat. No. 5,079,627 of Filo, U.S. Pat. No. 5,182,635 of Nakashima et al., U.S. Pat. No. 5,194,955 of Yoneta et al., U.S. Pat. No. 5,199,061 of Kim, U.S. Pat. No. 5,202,957 of Serrao, U.S. Pat. No. 5,204,893 of Choi et al., U.S. Pat. No. 5,230,015 of Yokodate et al., U.S. Pat. No. 5,278,889 of Papanicolaou et al., U.S. Pat. No. D341586 of Alvarez-Ryan et al., U.S. Pat. No. D345971 of Grewe et al., U.S. Pat. No. D345972 of Grewe et al.

The foregoing detailed description of the present invention is provided for the purposes of illustration and is not intended to be exhaustive or to limit the invention to the precise embodiment disclosed. Accordingly, the scope of the present invention is defined by the appended claims.

We claim:

1. In a system including a videophone receiving device having an audio device, a camera and a display screen, and a communications network being one of a cable television network and the Internet network, said video receiving device being connectable to said communications network, a method of providing information on said videophone receiver device to a calling party initiating a call over said communications network, comprising:
   a) receiving from the calling party a request for connection to said communications network;
   b) automatically selecting information for reception by the calling party on said videophone receiving device in response to the request; and
   c) routing the selected information to said videophone receiving device of the calling party while making the connection to a called party over said communications network.

2. A method according to claim 1, wherein the step of automatically selecting information for reception by the calling party includes accessing the information without request for the information by and based on knowledge of the calling party.

3. A method according to claim 1 further comprising:
   a) selecting information for reception by the called party in response to a request for connection by the calling party to said communications network to contact at least one other said called party;
   b) initiating a connection over said communications network to the called party; and
   c) routing the selected information for reception by the called party to the called party while making the connection to the called party.

4. A method according to claim 3 wherein the step of automatically selecting information for reception by the called party includes accessing the information without request for the information by and based on the knowledge of the called party.

5. A method according to claim 1 wherein the step of automatically selecting information includes accessing a message sourced by another party.

6. A method according to claim 5 further including supplying the message by said another party to said communications network.

7. A method according to claim 6 wherein the step of supplying comprises:
   a) transmitting the message to said communications network; and
   b) storing the message for access on said communications network.

8. A method according to claim 6 wherein the step of supplying comprises:
   a) storing the message on a storage medium; and
   b) transferring the storage medium to said communications network.

9. A method according to claim 1 wherein the step of selecting information comprises accessing information having a message that is local for the calling party.

10. A method according to claim 3 wherein the step of selecting information for the calling party comprises accessing a message that is local for the calling party, and the step of selecting information for the called party comprises accessing a message that is local for the called party.

11. A method according to claim 3 wherein the steps of selecting information for the calling party and the called party comprise accessing the same message for each said party.

12. A method according to claim 1, wherein the step of routing comprises transmitting the selected information to said videophone receiving device for display on said display screen.

13. A method according to claim 3 wherein the called party has a message receiving device and the steps of routing information to the calling party and the called party, respectively, comprise transmitting the selected information to each device for display on display screens of each device, respectively.

14. In a system including videophone receiving devices, each having an audio device, a camera and a display screen, and a communications network being one of a cable television network and the Internet network, said videophone receiving devices being connectable to said communications network, a method of supplying messages to any of a plurality of calling parties and called parties which communicate over said communications network via respective said videophone receiving devices, comprising:
   a) storing or accessing any of a plurality of messages;
   b) receiving from a calling party a request for connection over said communications network to at least one called party;
   c) automatically selecting a first message in response to the request from said calling party; and
   d) transmitting the first message to said videophone receiving device of the calling party for display on said display screen during the time of and prior to connecting the calling party to the called party.

15. A method according to claim 14 further comprising:
   a) processing the request for connection to connect the calling party to the called party;
   b) automatically selecting a second message in dependence on the party being called; and
   c) transmitting the second message to said videophone receiving device of the called party for display on said display screen during and prior to the time the called party accepts a connection from the calling party.

16. A method according to claim 15, further including discontinuing the transmission of the first message to the calling party and the second message to called party upon the connection of the calling party to the called party.

17. A method according to claim 14 wherein the step of automatically selecting the first message includes accessing the first message without a request for messages from the calling party.

18. A method according to claim 15 wherein the step of selecting the second message includes automatically accessing the second message without a request for messages from the called party.

19. A method according to claim 18, wherein the first message and the second message are the same.

20. A method according to claim 18, wherein the first message is a local message for the calling party and the second message is a local message for the called party.

21. A method according to claim 14, wherein a calling party and the called parties are to be connected as part of a videoconference over said communications network, and at least one of the messages is transmitted to one or more of the videoconferenced parties.

22. A method according to claim 14 wherein the step of storing any of a plurality of messages comprises supplying the messages to said communications network by a third party.

23. A method according to claim 22 wherein the step of supplying the messages comprises transmitting the messages to said communications network.

24. A method according to claim 22 wherein the step of supplying the messages comprises providing a storage medium storing the messages for coupling to said communications network.

25. A system, including a communications network and a videophone receiving device connectable to said communications network, for providing messages to a calling party, the messages having information of interest to the calling party and being other than status information about said communications network, said videophone receiving device having an audio device, a camera and a display screen, and said communications network being one of a cable television network and the Internet network, comprising:

a) means for storing or accessing the messages;
   b) means for receiving and processing a request from said videophone receiving device of the calling part for connection over said communications network to a called party;
   c) means, responsive to the request, for automatically selecting one of the messages independent of any action by the calling party and the called party other than the request, the content of the messages not necessarily being under control of either the calling party or the called party; and
   d) means for routing the one message in aural and visual form to the calling party.

26. A system, according to claim 25, wherein said means for routing comprises means for transmitting the one message to the calling party during a time prior to a communications network connection being made between the calling party and the called party.

27. A system, according to claim 25, wherein said means for storing comprises:

a) first means for storing local messages for the calling party; and
   b) second means for storing national messages for the calling party.

28. A system according to claim 25 further comprising:

a) means, responsive to the request, for selecting a message for the called party; and
   b) means for routing the message for the called party to said videophone receiving device of the called party.

29. A system, according to claim 28, wherein said means for routing comprises means for transmitting the message for the called party to said videophone receiving device of the called party during a time prior to a communications network connection being made to the called party.

30. A system according to claim 27, wherein said means for storing comprises third means for storing local messages for the called party, and said second storing means storing national messages for the called party.

31. A system according to claim 30, wherein said means for storing comprises fourth means for storing international messages.

32. A system according to claim 25 wherein said means for automatically selecting comprises means for accessing said storing means automatically and without a request for access by the calling party.

33. A system, according to claim 28 further comprising:

a) means for providing messages for the calling party; and
   b) means for providing messages for the called party.

34. A cable television of Internet network for enabling a calling party having a first videophone and a called party having a second videophone to communicate with one another over said network, each said videophone having an audio device, a camera and a display screen, comprising:

a) means for receiving from the calling party a request for connection to said network;
   b) means, in response to the request, for coupling said first videophone and said second videophone, there being a finite time during this coupling when communication between the calling party and the called party has not yet commenced;
   c) means for accessing or for storing messages of interest to the calling party and the called party; and
   d) means for automatically accessing and transmitting during the finite time one of the messages to the calling party and the called party for display on said display screen of said first videophone and said display screen of said second videophone respectively.

35. A cable television or Internet network for enabling a calling party having a videophone to communicate with a called party having a videophone over said network, each said videophone having an audio device, a camera and a display screen, comprising:

a) means for storing messages being variable in length and number;
   b) means for setting a minimum time for connecting the called party to the calling party to enable the called party to communicate with the calling party; and,
   c) means, responsive to a request for connection by the calling party, for automatically transmitting at least one of the messages having a length that can be received by the called party during the minimum time.

* * * * *